United States Patent [19]

Ohzono et al.

[11] Patent Number: 4,936,813
[45] Date of Patent: Jun. 26, 1990

[54] CHAIN BELT FOR V PULLEYS

[75] Inventors: Kouhei Ohzono; Kiyotaka Hayashi; Hiroyuki Kuwahara; Yoichi Kojima, all of Saitama, Japan

[73] Assignee: Honda Giken Kogyo Kabushiki Kaisha, Tokyo, Japan

[21] Appl. No.: 325,415

[22] Filed: Mar. 17, 1989

[30] Foreign Application Priority Data

Mar. 18, 1988 [JP] Japan .................................. 63-65381
Mar. 18, 1988 [JP] Japan .................................. 63-65382

[51] Int. Cl.⁵ .............................................. F16G 1/24
[52] U.S. Cl. ..................................... 474/242; 474/245
[58] Field of Search ............... 474/237, 242, 244, 245, 474/201

[56] References Cited

U.S. PATENT DOCUMENTS 4,608,036 8/1986 Dono ............................... 474/245 X
4,643,704 2/1987 Honda .................................. 474/245

FOREIGN PATENT DOCUMENTS 3108390 11/1981 Fed. Rep. of Germany .
3627815 8/1987 Fed. Rep. of Germany .
1112658 5/1968 United Kingdom .
2144197 2/1985 United Kingdom .
2185300 7/1987 United Kingdom .

Primary Examiner—Thuy M. Bui
Attorney, Agent, or Firm—Lyon & Lyon

[57] ABSTRACT

A chain belt for stepless speed change transmission is provided wherein the connecting link rocker pins are arranged so that when the chain links are rotated relative to each other the pitch changes. This phenomena is used to reduce the drive noise generated with standard types of chain belts when they wrap around the drive pulley, due to a change in the relative speed of the drive block. From tests it is found that having the drive blocks outside of the chain line is more effective in reducing this relative velocity. Further having oval shaped drive blocks reduces the stress concentration at the region where load is transferred from the pulley to the chain belt, and by having an oval shape instead of a round shape the inclined end contact faces can be positively aligned to mate properly with the drive faces of the pulleys.

9 Claims, 8 Drawing Sheets

CHAIN BELT FOR V PULLEYS

BACKGROUND OF THE INVENTION

The field of the present invention is chain belts for V pulleys, especially, V pulleys used in stepless speed change transmissions for heavy vehicles.

A general example of a stepless speed change transmissions for heavy vehicles in shown in FIG. 1 consisting of a pair of V pulleys with an endless chain belt wrapped around these pulleys to transmit a drive force from one pulley to the other.

As shown in FIG. 2 and FIG. 3 this chain belt 1 is made of chain links each of which have a protruding section to form a Y shape. There is a main link plate 2 and sub-link plate 3 and both these plates have holes 2a and 3a formed in them at the same pitch. These plates are interleaved so that the holes line up and into these holes are inserted rocker pins 4 and 5 to provide a curved contact face to connect the link plate 2 and sub-link plate 3 together so that they can move freely rotatably to each other. In the protruding section of the link plates 2 are holes to take a drive block 6 which fits tightly into the holes to form a single body with the respective pair of link plates.

The plurality of sub-link plates 3 are positioned between the main link plates 2 with their respective holes 3a lining up with the holes 2a in the main link plates so as to make up No. 1 unit A assembly as shown in FIG. 3. A No. 2 unit B assembly is made up similarly but with one sub-link plate less than the No. 1 unit A assembly, so as to fit between the No. 1 unit A assembly. These No. 1 unit A and No. 2 unit B assemblies are arranged alternately and slid together to intermesh. Then rocker pins 4 and 5 are fitted in holes 2a and 3a respectively of link plates 2 and 3 to connect the link plates together.

The rocker pins 5 are inserted in the respective holes 2a of No. 1 unit A with their contact surfaces facing towards each other and rocker pins 4 are inserted in the respective holes 3a of No. 2 unit B with the contact surfaces facing each other so that the contact faces of rocker pin 5 and rocker pin 4 contact each other when the units are assembled together with the sub-link plates 3. By this arrangement the endless chain is formed as shown in FIG. 2 with No. 1 units A and No. 2 units B alternating.

The rocker pins 4 and 5 are fitted in holes 2a and 3a, but so that the internal faces coincide correctly, relative rotation is restricted. However, link plates 2 and 3 are able to pivot relative to each other. Further the contact faces of rocker pins 4 and 5 are maintained in the link plates 2 and 3 so that they contact at the central position with respective units A and B arranged in a straight line. Also, the drive block 6 is kept inside of the chain line L formed by the connections of rocker pins 4 and 5, as shown in FIG. 1. Consequently when the chain belt wraps around V pulley P this drive block 6 contacts at a smaller diameter than that of the chain line L.

With the chain belt 1 constructed in this way and wrapped around V pulleys P as shown in FIG. 1 the drive block 6, as shown in FIG. 3, contacts the transmission drive face of V pulley P at both ends and by the friction of contact, drive force is transmitted from one V pulley P to the other V pulley P. Also by changing the contact radius between the drive blocks and the respective V pulleys P, stepless speed change between the two V pulleys P can be achieved.

A problem with this arrangement of chain belt is that, when the chain belt wraps around the V pulley P, a drive sound is generated resulting in an undesirable condition. The cause of this sound is considered to be due to the following phenomena.

When the speed change is at a fixed condition, the chain belt 1 speed is fixed. Considering the chain line L between the respective V pulleys P, the speed of drive block 6 is the same as that of chain line L (This drive block is shown as 6a in the schematic diagram of FIG. 4). However, as shown in FIG. 4, when this drive block wraps around V pulley P (shown as 6b in FIG. 4), the drive block speed changes to Vb due to the differences between the contact point radius RB of drive block 6 and the radius to the chain line L. In this example, since drive block 6 is a distance S inside the chain line L the speed Vb is less than V. This change in speed results in an impact which is considered to give rise to the drive sound and this is supported by the results of an experiment illustrated in FIG. 5 showing the relation between the relative speed of chain line L and drive block 6b and the drive sound. Accordingly, to reduce this drive sound in stepless speed change transmissions using the chain belt 1, it is necessary to keep the relative speed of chain line L and drive block 6b as small as possible. This is one of the problems that this invention is aimed at solving.

A further problem is that, with previously constructed chain belts, the drive block 6b has been of a rectangular shape resulting in stress concentrations occurring at the contact area between the drive block and the main link plate 2. To reduce these stress concentrations a cylindrical shaped drive block 8 fitted into circular holes 9 in the respective link plates 2 and 3 as shown in FIG. 6 has been considered. However, with a cylindrical shaped drive block 8 it is difficult to ensure correct alignment during assembly of the contact end angles of the drive blocks 8a which are cut at an angle to mate with the inner contact faces of the V pulleys P. This makes manufacture and assembly of the chain belt difficult.

SUMMARY OF THE INVENTION

It is an object of the present invention to solve the above problems of drive sound emission and stress concentration in the drive transfer block and its supporting link plates. In a first embodiment of the present invention, the chain belt considered is one for transmitting a drive between V pulleys. Single holes are made in each link plate and into these holes are fitted drive blocks to contact the contact faces of the V pulleys. A pair of rocker pin holes are also made in each end of the link plates. The link plate assemblies are slid together so that the rocker pin holes line up, and rocker pins with curved contact surfaces are inserted into the holes so that the pairs of rocker pins provide contacting surfaces enabling the plurality of link plate assemblies to turn relative to each other.

With the respective link plates arranged in a straight line, both rocker pins are maintained so that the contact position of the rocker pins is away from the rocker pin contact face central position towards the chain belt rotational center side of the link plate. Further, the links are arranged so that the drive blocks are positioned outside the chain line. This arrangement is found to be favorable in reducing the speed differential between the drive block and the chain line arising when the chain wraps around the pulley.

With this arrangement, as the chain wraps around the V pulley during drive, the contact position moves toward and passes through the center area of the rocker pin contact surface depending on relative movement of the links, and then moves back so that the distance between the center of curvature of the respective rocker pins (i.e. the chain pitch) changes, and by this the chain line speed of the section wrapped around the V pulley changes and the drive block relative speed is decreased. Consequently, the drive sound emitted when the chain starts to wrap around the V pulley is reduced.

In another embodiment of this invention, the drive block attached to the main link plate is made with an oval shaped cross section and both ends that contact the drive transmission face of the V pulley are made with approximately the same slope as the V pulley drive transmission face. Having an oval shape between the respective parallel faces, and a corresponding similar shape in the main link plate holes, enables the load to be smoothly spread from the drive block to the main link plate thereby eliminating stress concentration and enabling a thinner link plate to be used to carry the same load.

Also having an oval shape instead of round shape ensures that the slopes of the ends of the drive blocks are correctly aligned to match the contact face of the V pulley. With this arrangement, the parallel faces formed on both sides of the drive block match the parallel faces of the fitting hole made in the main link plate.

DESCRIPTION OF THE PREFERRED EMBODIMENTS

A first preferred embodiment will be described with reference to FIG. 7 to FIG. 13.

Figure 1:
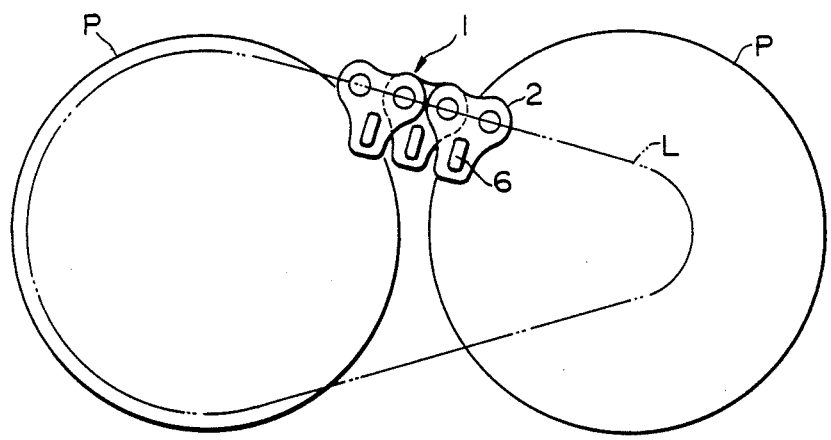
FIG. 1 shows an arrangement with a chain belt for providing stepless speed change between V pulleys.
Figure 7:
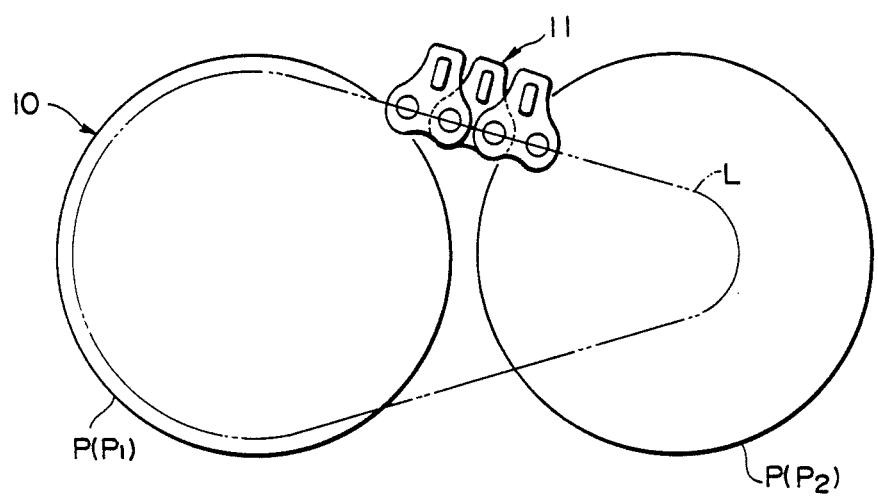
FIG. 7 shows an arrangement of an embodiment of the invention with the drive blocks outside the chain line.
Figure 2:
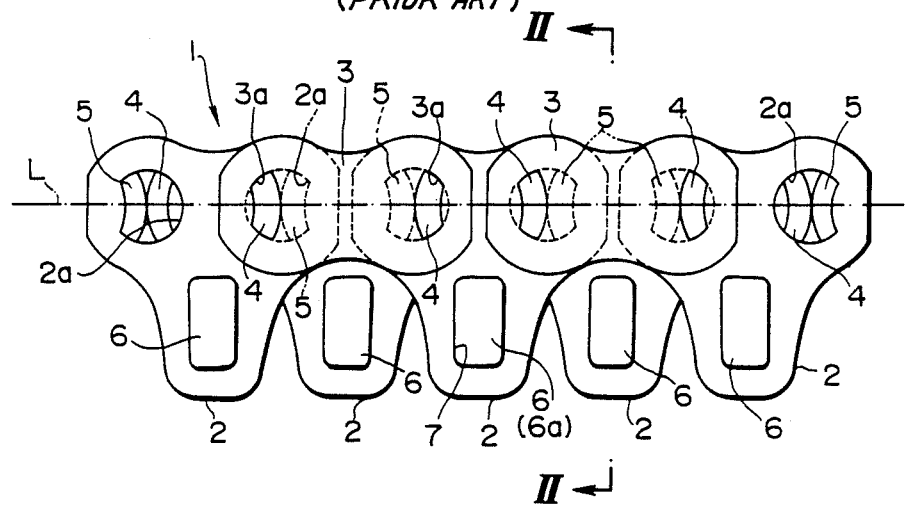
FIG. 2 is the side view of a section of a prior art chain belt considered in this invention.

FIG. 7 gives an outline of this invention applied to a stepless variable speed device. In this figure numeral 10 indicates a stepless speed change device, with a pair of pulleys P1, P2 arranged apart at a suitable distance, and between these V pulleys P1, P2, is fitted an endless chain belt 11 related to this preferred embodiment.

Figure 8:
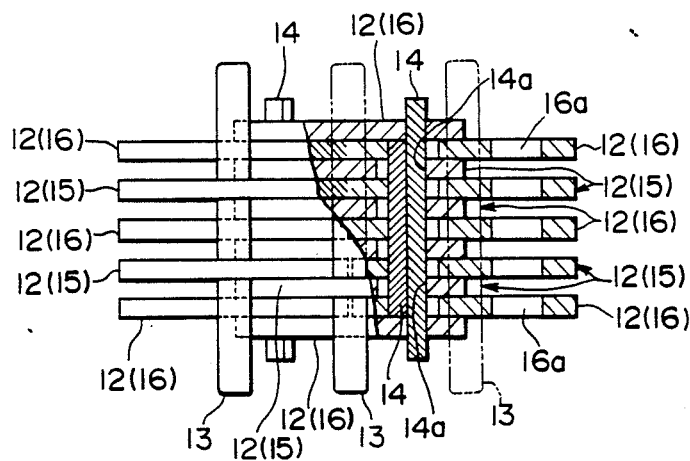
FIG. 8 is a plan view cut away section of a part of a chain belt of this invention.
Figure 9:
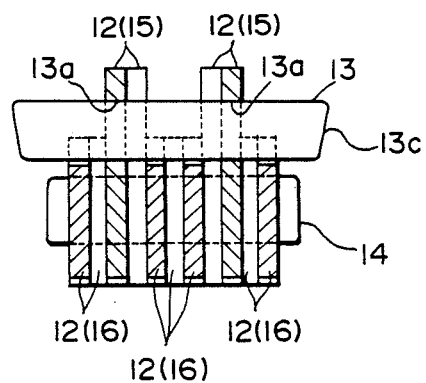
FIG. 9 is a cross section of the chain belt in FIG. 8.
Figure 10:
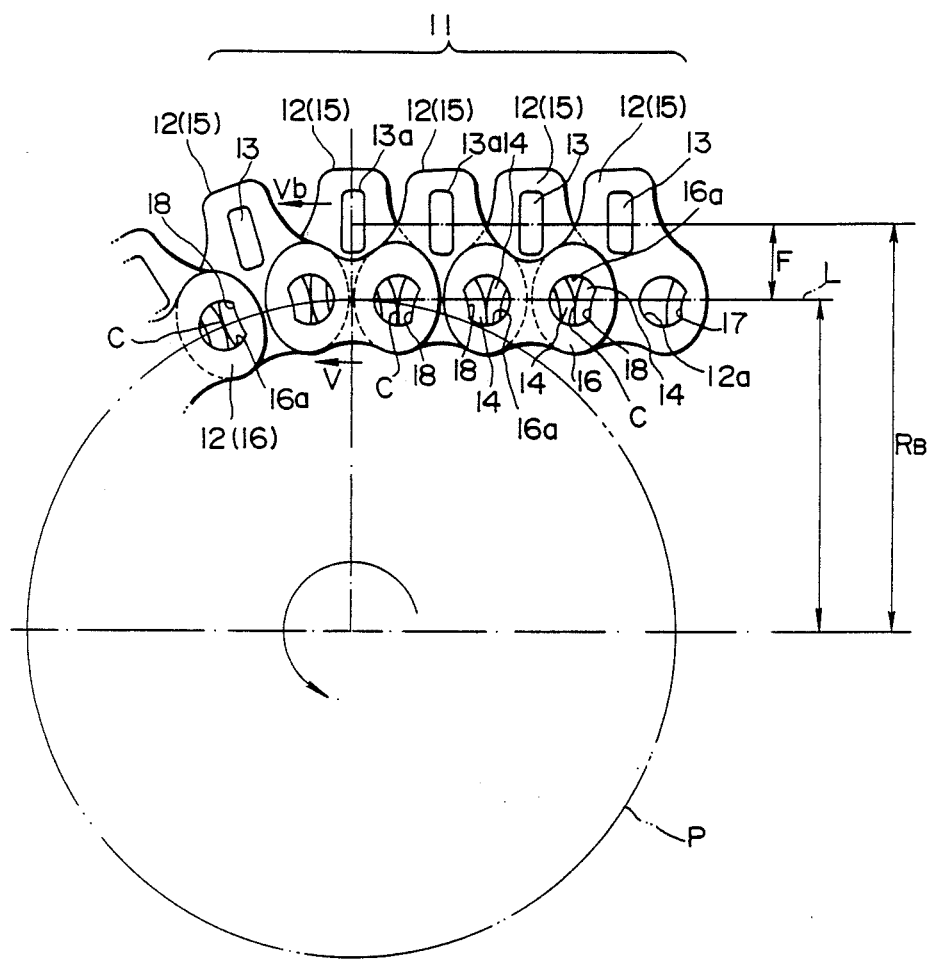
FIG. 10 is a view to explain the chain belt drive.

This chain belt 11, is shown in FIG. 8 to FIG. 10, with a plurality of main link plates 12(16) each of which have holes 13a formed therein to accommodate drive blocks 13 that contact the drive faces of V pulleys P (P1, P2), and other holes 14a to accommodate pairs of rocker pins. Between these main link plates are inserted sub-link plates 12(15) with holes 16a adjacent opposite ends. With the holes 14a of the main link plates aligned, the pair of rocker pins 14 are inserted into the holes with the arched shaped surfaces of the rocker pins 14 coinciding with the internal arch shaped surface of the holes 14a. The plurality of link plates are interleaved and connected together with the rocker pins 14 so that the link plates are able to turn relative to each other to form an endless chain. With the link plates 12 arranged in a straight line, as shown in FIG. 10, the rocker pins 14 in the respective pairs are maintained so that the contact point, C, is disposed away from the central position of the contact faces 14a of the rocker pins 14 toward the rotational axis side of the chain belt link plates. Also the drive blocks 13 are arranged to be outside the chain line L formed by the connection of the rocker pins 14.

The following is a detailed explanation of the construction. The link plates 12 are constructed, as shown in FIG. 8 to FIG. 10, with holes 14a pierced in oppositely spaced protrusions. A drive block 13 is fitted into holes 13a in the remaining protrusion to form a single unit main link plate 12(15), and as shown in FIG. 8 and FIG. 9. To the side face of the main link plate 12(15), sub-link plates 12(16) are provided to maintain a fixed interval and to carry the load. These sub-link plates 12(16) have holes 16a the same shape as main link plates 12(15) holes 14a.

In the longitudinal direction of chain belt 11 the holes 14a, 16a in said main link plate 12(15) and sub-link plate 12(16), respectively, are provided with locating protruberances, 17 and 18, at the front and rear portions of holes 14a and 16a, respectively. These protruberances 17, 18 are formed in the holes 14a, 16a and the inside face of the rocker pins 14 match with them. In this way the relative movement of the rocker pin 14 in the main link plate 12(15) or sub-link plate 12(16) is restricted. Also with the chain belt 11 in a straight line condition the rocker pin contact positions are maintained in the aforementioned position which is set by the positional relationship of the main link plate 12(15) and sub-link plate 12(16).

Figure 11:
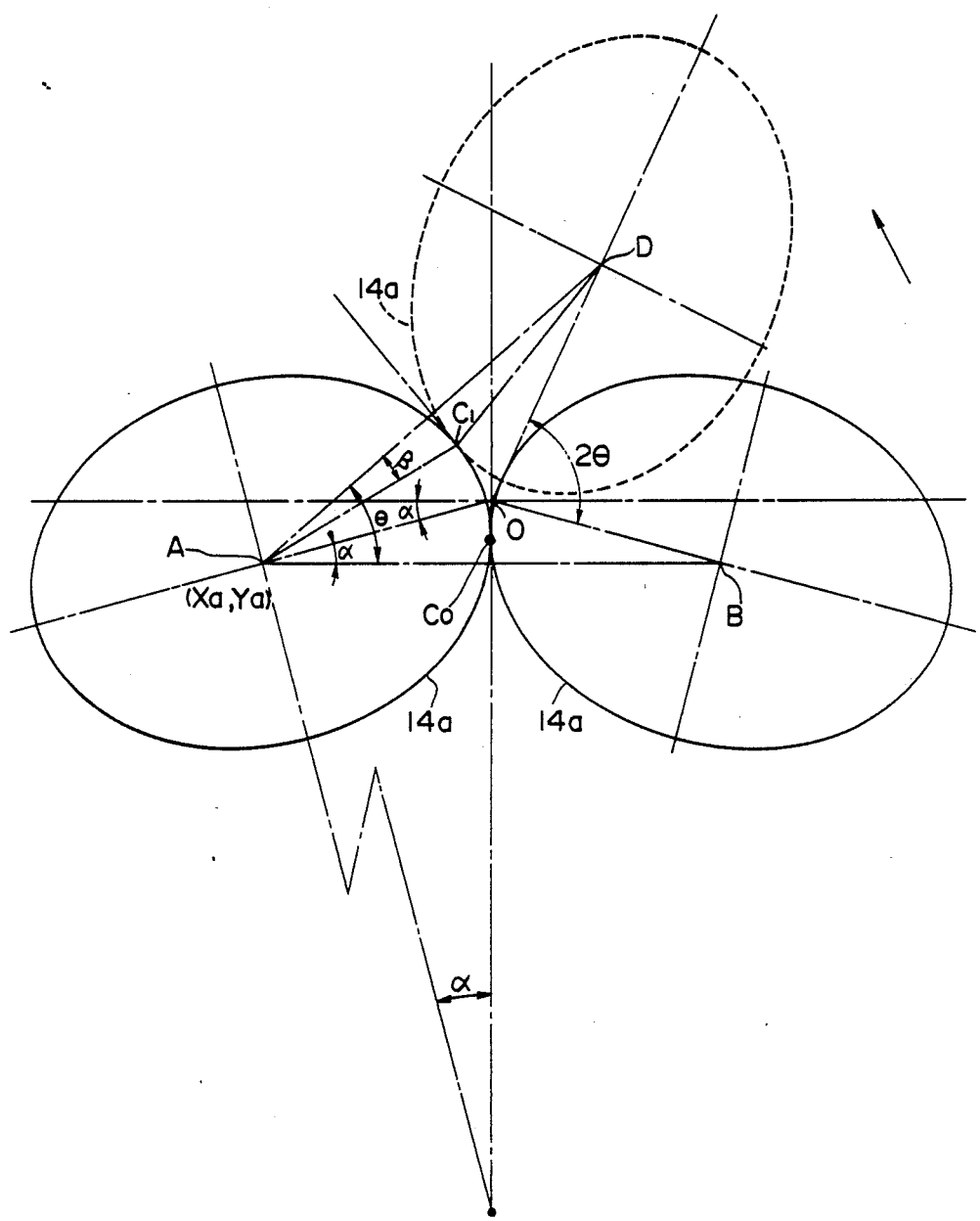
FIG. 11 is a diagram to explain the rocker pin contact face conditions.

The shape of the rocker pin 14 contact face in this preferred embodiment is shown in FIG. 11 with the long diameter side of the elliptical shape being used. The movement of the contact point of both rocker pins 14 satisfies the following equation:

$$R = (a^4 + b^4 + c^2)/(a^2 + b^2 + c^2) \tag{1}$$

where;
R = distance from the rocker pin center of curvature (A,B) to the contact point C.
a = major diameter of the ellipse
b = minor diameter of the ellipse
c = tan $\theta$
$\theta$ = rocker pin 14 angular rotation When the rocker pin 14 contact point C (whose initial position is referred to hereinafter as "the initial contact point Co") is set with chain belt 11 in a straight line condition, the contact face 14a center section is positioned to be away to either side of the initial contact point Co of both rocker pins 14. With the contact faces 14a in the contact state, the center section on the major axis is positioned above the contact point with the straight lines through the major axes of the ellipses intersecting above the contact point of the rocker pins. With the lines along the respective minor axes b in the parallel condition (hereinafter referred to as "the centralized position"), the centers of curvature of both rocker pins 14 move to a position on the outer side of the chain line and their centers are spaced further apart. The amount of change in spacing depends on the predetermined angular rotation (referred to as "the incline angle").

In the case with the initial contact point Co set, then with rotation of the link plate 12 from its initial position, the chain pitch Z gradually changes. This change in the chain pitch Z is explained as follows.

First, as shown in FIG. 11 the coordinate system is formed with the origin O at the intersection of the lines along the major diameters a of both rocker pins 14 with the Y axis passing through O and the contact point of the rocker pins, and the X axis is perpendicular to the Y axis and parallel to the line through the centers of the ellipses A and B. The center of one of the rocker pins 14 at A has coordinates Xa, Ya. In this initial position the rocker pin 14 incline angle $\alpha$ is obtained. Further chain pitch Z can be determined in terms of the X axis direction pitch Zx and Y axis direction pitch Zy.

Here the rocker pins 14 shown as a full line in FIG. 11, are in the initial position. From this position conditions with various angles of $\theta$ are considered and the relation of both rocker pins 14 to the contact point C1 is also considered: Considering the relation of the centers of curvature A and B the following equations are obtained:

$$\beta = \theta - \tan^{-1}(c * b^2/a^2) \quad (2)$$

$$L = (Xa^2 + Ya^2)^{\frac{1}{2}} \quad (3)$$

$$Zx = Ro * \cos + 62(\beta)_o - R * \cos(\theta - \beta) - R * \cos(\theta - \beta) + L * \cos(2\theta + \alpha) + Z * \cos2\theta \quad (4)$$

$$Zy = Ro * \cos\beta_o * \tan\alpha + R * \sin(\theta - \beta) + R * \sin(\theta + \beta) - L * \sin(2\theta + \alpha) - Z * \sin2\theta \quad (5)$$

$$Z = (Zx^2 + Zy^2)^{\frac{1}{2}} \quad (6)$$

Figure 12:
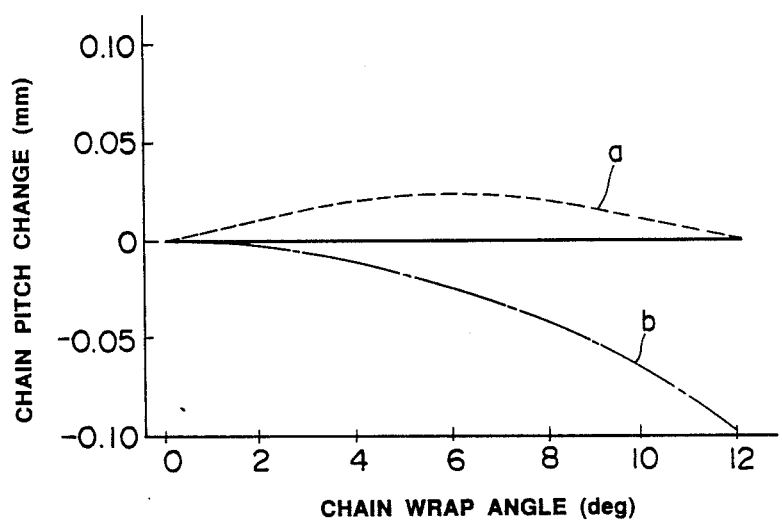
FIG. 12 is a diagram showing the change in chain pitch with chain wrap angle.

If the relation between the chain pitch Z and chain wrap angle $2\theta$ is considered when the initial incline angle $\alpha$ is at 3°, the change shown by dotted line a FIG. 12 is obtained. When the initial incline angle $\alpha$=O, the line b is obtained. In this way, depending on the incline angle $\alpha$ given to both rocker pins 14, then at the time of the chain belt 11 wrapping around V pulley P, the chain belt 11 pitch Z first increases and then returns to the standard pitch.

Hereafter is explained the effect of the first embodiment chain constructed as described. As shown in FIG. 10, the chain belt 11 wraps tangentially around the V pulley P rotating in the direction of the arrow. Considering the section above the chain line L of chain belt 11, the speed is at the same fixed speed V in agreement with V pulley P rotation. However from the time when drive block 13, outside chain line L contacts with V pulley P, its speed becomes Vb and is greater than the chain line speed V as it moves with the V pulley P.

Here, depending on the wrapping of the chain belt 11 and the pivoting of the rocker pins 14 at the time of initial wrapping, since the chain pitch Z extension phenomena occurs at this time the speed of the wrapping section above the chain line L increases.

Figure 4:
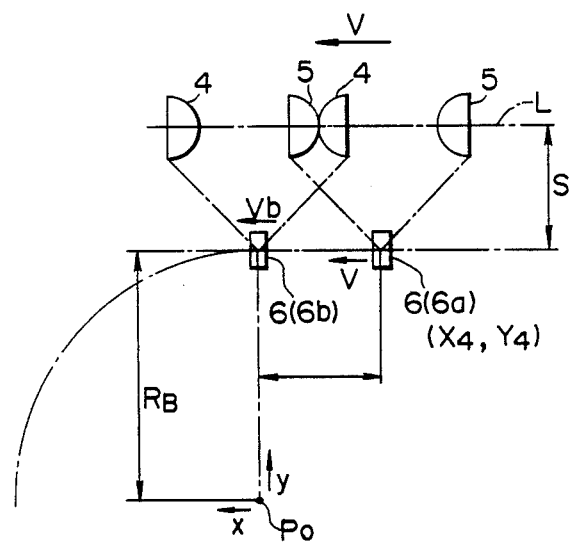
FIG. 4 is a schematic diagram showing the chain belt and pulley coordinates.
Figure 5:
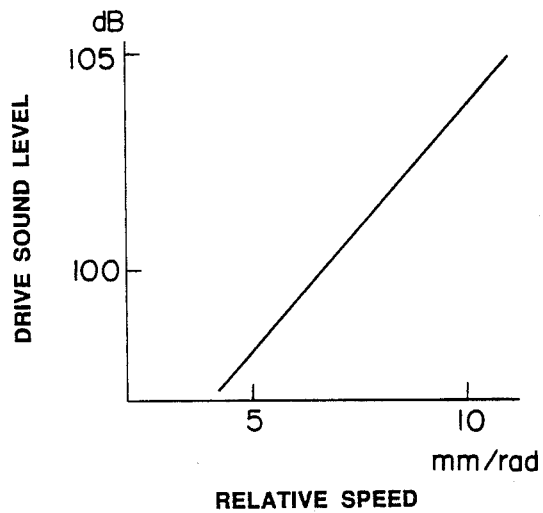
FIG. 5 shows the increase in drive sound level with increase in chain line relative speed.
Figure 6:
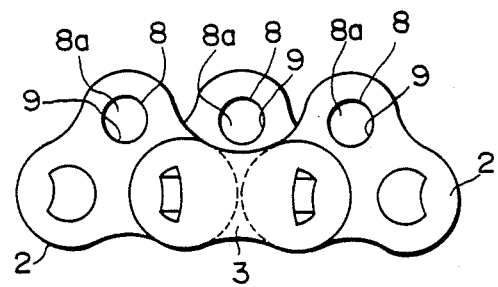
FIG. 6 shows a chain belt with cylindrical drive blocks.

The result is that the speed of the section above chain line L approaches that of the drive block 13 and the difference in speed between the drive block 13 and the chain line becomes less so that drive sound occurring at the time of wrapping is reduced. The speed difference is related to the difference between the drive block 13−V pulley P contact position and the distance RB from the V pulley P center to the chain line L (hereinafter referred to as "the offset value F"). This relation between the relative speed and diameter RB is given by the following equation:

$$\text{Relative speed} = \{(dx^4/d\theta - RB)^2 + (dy^4/d\theta)^2\}^{\frac{1}{2}} \quad (7)$$

Where x4 and y4 are the coordinates of the drive block 6a related to the coordinate system of FIG. 4 passing through the center of the V pulley P, and chain line L is parallel to the X axis.

With this embodiment, however, the drive block 6a in FIG. 4 is outside the chain line L giving a bigger radius of travel for the drive block, which is considered to be effective in reducing the sound. However in this case, due to the enlargement of diameter, the stress due to the centrifugal force increases and it is necessary to give this careful thought.

Figure 13:
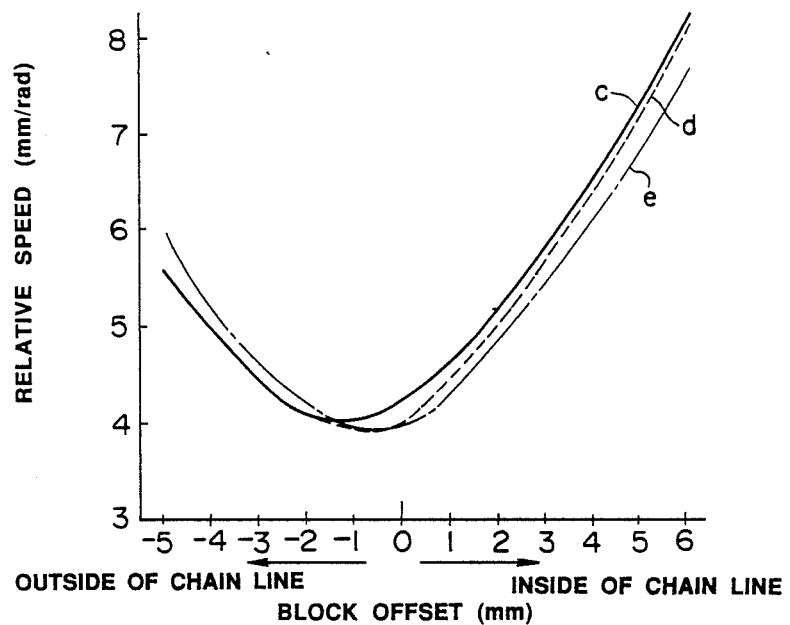
FIG. 13 is a diagram showing the relation between drive block offset and the relative speed.

Also, concerning the relation between offset value F and relative speed, FIG. 13 shows the results of an experiment. In this figure the offset value F is positive inside the chain line L and negative outside of the chain line L. Curves c, d and e show the measured results depending on the following conditions:

Curve c
1. 14a contact face shape:elliptical
2. Inclination angle $\alpha$:3°

Curve d
1. 14a contact face shape:round
2. Inclination angle $\alpha$:0°

Curve e
1. 14a contact face shape:round
2. Inclination angle $\alpha$:3°

From these results, for the same offset value F it is seen to be more effective to have drive block 13 arranged outside the chain line L. Depending on the application of this phenomena, the relative speed of the drive block can be reduced or increased in relation to the speed of the chain line L providing an effective way to eliminate drive sound.

Also, by separating the drive block as far as possible from the center of rotation of the V pulley, the load on the drive block for the same drive force is reduced, and a secondary effect of reduction in lateral loading given to the drive block from the V pulley can also be expected.

The above is just one example of a possible construction and application of the preferred embodiment of the invention and it is possible to have other arrangements based on changes in design to suit requirements.

A second preferred embodiment of this invention explained with reference to FIG. 9 and FIG. 14 wherein for simplicity the same numerals are used to designate elements.

Figure 14:
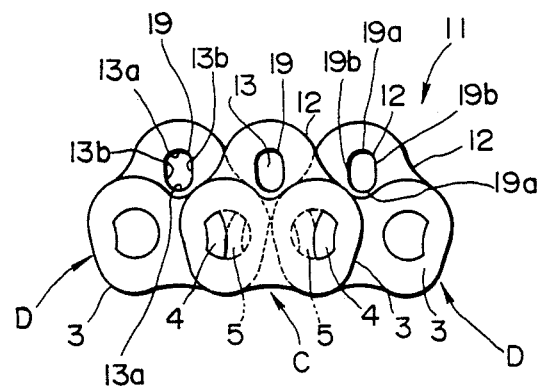
FIG. 14 shows a side view of a section of chain of this invention.

Numeral 11 in FIG. 14 identifies the chain belt of this preferred embodiment. It consists of a plurality of main link plates 12 connected to pivot freely with respect to each other by rocker pins 4,5, and a drive block 13 that transmits load from the power transmission face of V pulley provided in the respective main link plates 12. This embodiment is particularly concerned with the drive block 13 cross sectional shape and, as shown in FIG. 14, this is formed with a pair of parallel faces 13b smoothly blended to arc shaped faces 13a to form an oval shape. Both ends that contact the drive face of V pulley P are formed at an angle to produce the contact face 13c shown in FIG. 9. This angle is the same as the angle of the V pulley P drive face so that it has approximately complete contact with the drive face. Drive block 13 is attached to the main link plate 12 by forcing it into hole 19. In this hole 19 the pair of parallel faces 19b are blended to symmetrical arc shaped faces 19a made with a cross section approximately the same as that of the drive block 13.

Figure 3:
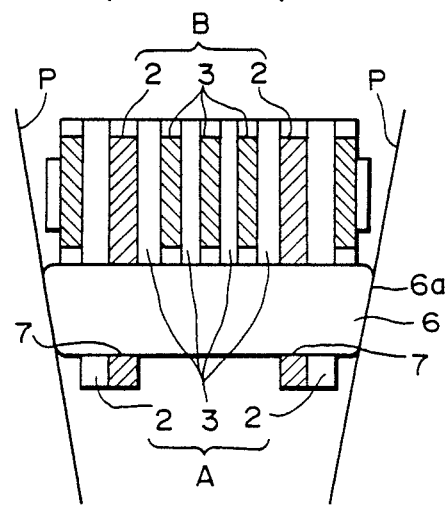
FIG. 3 is a cross section through II of the chain belt in FIG. 2.

With this construction, after the drive block 13 is inserted in the main link plate 12, the assembly becomes similar to the heretofore mentioned assemblies No. 1 unit A and No. 2 unit B of FIG. 3. Both of these units are connected successively by rocker pins 4 and 5 to make the endless chain belt 11.

Also, when drive block 13 is connected to main link plate 12, the parallel faces 19b of the hole 19 made in main link plate 12 align with the parallel faces 13b of drive block 13 so that it is easy to set the drive block 13 correctly with the outer end slopes that are aligned to correctly match with the drive face slope of the V pulley P. Thus, assembly is greatly simplified.

In the case with the drive block 13 arranged on the outer side of the chain line L, the loading from V pulley P is transmitted from drive block 13 to the main link plate 12, and, since the contact faces of the drive block 13 and the main link plate 12 (i.e. 13a, 13b and 19a, 19b respectively) are smoothly rounded, the stress in the main link plate 12 is smoothly distributed. Accordingly, an improvement of main link plate 12 load capacity can be expected so that it is possible to make the main link plates 12 thinner in the load direction.

This preferred embodiment is only one example of the many possible shapes and methods etc. and can be modified to include the many other possibilities depending on the types of power transmission applications, classifications and design requirements etc.

What is claimed is:

1. An endless chain belt for power transmission between V pulleys having drive faces for contacting the endless chain belt, the endless chain belt comprising:
   (a) a plurality of link plates through which drive block holes and rocker pin holes are formed, said link plates being interleaved by aligning the rocker pin holes of adjacent link plates;
   (b) a plurality of pairs of rocker pins, the rocker pins in each pair having mutually engaging contacting surfaces and being inserted into each of the aligned rocker pin holes for connecting the link plates together, each said pair of rocker pins being pivotally movable, with pivotal movement of the connected link plates, while keeping their contacting surfaces in contact with each other, said rocker pins being effective to change the distance between the connected link plates in accordance with the pivotal movement of said rocker pins; and
   (c) a plurality of drive blocks inserted into the drive block holes, both ends of the drive blocks extending out of the link plates for contacting the drive face of the V pulleys; whereby the link plates connected to one another by the rocker pins form an endless chain belt and the drive blocks contact the V pulleys for power transmission.

2. An endless chain belt according to claim 1, wherein the drive blocks are disposed radially outward from the rocker pins, the rocker pins having ellipsoidal contact surfaces describing a portion of an ellipse having major and minor axes, and points whereat the major axes cross the respective contacting surfaces are disposed radially outward from contact points, whereat the contacting surfaces contact each other, so that the distances between the link plates are extended when the chain belt is bent to be wound around the V pulleys.

3. In an endless chain belt for power transmission between V pulleys having drive faces for contacting the endless chain belt, the endless chain belt which includes:
   (a) a plurality sets of link plates, a pair of rocker pin holes being formed through each of the link plates, each set of link plates being comprised of a plurality of the link plates overlapped and spaced apart, one from the other, by aligning the rocker pin holes, the sets of the link plates being interleaved together in the space by aligning the rocker pin holes of adjacent sets;
   (b) a plurality pairs of rocker pins, each of the pins having a convexly curved surfaces, which curvature coincides with a section of an ellipse, each pair of the rocker pins being inserted into each of the aligned rocker pin holes for connecting the sets of the link plates together, one rocker pin of said each pair being fixed in the corresponding rocker pin hole and the other thereof slidably contacting said one rocker pin at the convexly curved surfaces thereof, each rocker pin in each pair being movable along the curved shape thereof relative to the associated rocker pin while the convexly curved surfaces contact each other at a point; and
   (c) a drive block attached to each of the sets of the link plates, both ends of the drive blocks extending out of the assembled link plates for contacting the drive face of the V pulley;
   whereby the link plates connected to one another by the rocker pins form an endless chain belt and the drive blocks contact the V pulleys for power transmission;
   the improvement wherein the contact point of each pair of rocker pins is disposed radially inwardly of a chain line formed by middle points of the curved surfaces when the rocker pin holes are disposed in a straight part of the path thereof, the drive blocks being disposed outside the chain line.

4. An endless chain belt according to claim 3, wherein each of the link plates has a drive block hole formed therethrough for receiving the drive blocks, the drive block holes being oval and the drive blocks slopes at both ends and an oval cross section approximately identical to the drive block holes so that the drive block holes at a predetermined rotational position and the slopes at both ends fittedly contact the drive faces of the V pulley.

5. An endless chain belt for power transmission between pulley members including a plurality of link plates arranged in groups, each group containing a plurality of link plates each having a pin-receiving hole adjacent opposite ends thereof, the link plates in one group being pivotably intermeshed with those in the other group with the pin-receiving holes of the link plates of the respective groups being alignedly disposed;

a pair of rocker pins in each said pin-receiving hole for interconnecting said link plate groups, said rocker pins each being arcuately formed and paired in said pin-receiving holes with their contact surfaces convexly disposed in constant face-to-face engagement; and means in said pin-receiving holes for positioning the rocker pins in each pair to place their contact surfaces in contact at a point displaced from the center of said pin-receiving holes in the direction of pivotal movement of said link plates.

6. An endless chain belt according to claim 5 in which the contact surface of each said rocker pin is ellipsoidal.

7. An endless chain belt according to claim 5 including means in each group of link plates for mounting pulley-engaging drive blocks, said means disposing said drive blocks on the opposite side of the centers of said pin-receiving holes from that in the direction of which said rocker pin contact surfaces are displaced.

8. An endless chain belt according to claim 6 including means in each group of link plates for mounting pulley-engaging drive blocks, said means disposing said drive blocks on the opposite side of the centers of said pin-receiving holes from that in the direction of which said rocker pin contact surfaces are displaced.

9. An endless chain belt according to claim 7 in which said drive block mounting means comprise holes alignedly positioned in each of said link plates and having a shape conforming to the cross sectional shape of said drive block and wherein said drive blocks have a cross sectional shape comprising oppositely spaced straight sides and arcuately formed ends tangentially joining the respective sides.

* * * * *